(12) United States Patent
Weida

(10) Patent No.: US 7,665,096 B2
(45) Date of Patent: Feb. 16, 2010

(54) DDS-ASSISTED CORBA DISCOVERY

(75) Inventor: James H. Weida, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 11/282,208

(22) Filed: Nov. 18, 2005

(65) Prior Publication Data

US 2007/0118842 A1 May 24, 2007

(51) Int. Cl.
*G06F 3/00* (2006.01)
*G06F 15/16* (2006.01)

(52) U.S. Cl. ...................... 719/316; 709/203

(58) Field of Classification Search ................ 718/106; 719/315, 316, 328, 330, 331, 332; 709/203
See application file for complete search history.

(56) References Cited

U.S. PATENT DOCUMENTS

| | | | | |
|---|---|---|---|---|
| 6,202,207 | B1* | 3/2001 | Donohue | 717/173 |
| 6,269,373 | B1* | 7/2001 | Apte et al. | 707/10 |
| 6,792,608 | B1* | 9/2004 | Theeten | 719/316 |
| 6,910,070 | B1* | 6/2005 | Mishra et al. | 709/224 |
| 7,533,128 | B1* | 5/2009 | Sanchez et al. | 707/104.1 |
| 2003/0074484 | A1* | 4/2003 | Cheng et al. | 709/316 |
| 2005/0022208 | A1* | 1/2005 | Bolar et al. | 719/315 |
| 2006/0106864 | A1* | 5/2006 | Broussard | 707/103 Z |

OTHER PUBLICATIONS

Karoui Ramzi "Corba/DDS, Competing or Complementing Technologies?" PrismTech Jul. 2005.*

"Data Distribution Service for Real-time Systems Specification", Dec. 2004, Version 1.0, Object Management Group, pp. 1-261. http://www.omg.org/docs/formal/04-12-02.pdf.

"Common Object Request Broker Architecture: Core Specification", Mar. 2004, Version 3.0.3, Object Management Group, pp. 1-1154. http://www.omg.org/docs/formal/04-03-01.pdf.

"Naming Service Specification", Oct. 2004, Version 1.3, Object Management Group, pp. 1-60. http://www.omg.org/docs/formal/04-10-03.pdf.

"Event Service Specification", Oct. 2004, Version 1.2, Object Management Group, pp. 1-65. http://www.omg.org/docs/formal/04-10-02.pdf.

"Notification Service Specification", Oct. 2004, Version 1.1, Object Management Group, pp. 1-227. http://www.omg.org/docs/formal/04-10-11.pdf.

Bolton, "Pure CORBA: A Code-Intensive Premium Reference", Sams Publishing, 2001, ISBN 0-672-321812-1, Text Book.

Henning et al., "Advanced CORBA Programming with C++", Addison-Wesley, Menlo Park, California, 1999, ISBN 0-201-37927-9, Text Book.

* cited by examiner

*Primary Examiner*—Li B Zhen
*Assistant Examiner*—Charles E Anya
(74) *Attorney, Agent, or Firm*—Armstrong Teasdale LLP

(57) ABSTRACT

A computer network environment that supports both Common Object Request Broker Architecture (CORBA) and Data Distribution Service (DDS) can employ the techniques described herein. The techniques relate to CORBA discovery, which enables clients to learn the location of a function or service maintained by a server in the computing environment. The CORBA discovery methodology described herein utilizes a DDS infrastructure to communicate data objects from the server to the clients such that each of the subscribing clients can create a proxy for communication with the server. Once the CORBA discovery procedure is complete, subscribing clients can call the desired server function using their respective proxies.

19 Claims, 8 Drawing Sheets

US 7,665,096 B2

DDS-ASSISTED CORBA DISCOVERY

TECHNICAL FIELD

The present invention relates generally to computer system communication techniques. More particularly, the present invention relates to protocols for establishing client-server communications between software applications in a computer network architecture.

BACKGROUND

The Common Object Request Broker Architecture (CORBA) is an open architecture and infrastructure that computer applications employ to synchronously communicate with each other over computer networks. The CORBA specification is published by Object Management Group (OMG) and the specification is accessible via the OMG website: www.omg.org. Briefly, one CORBA-compliant application running on one computer on a network can interoperate with another CORBA-compliant application running on another computer on the network, regardless of their respective hardware platforms, operating systems, and programming language. CORBA is a type of "middleware" that can be used in a client-server architecture to enable client applications to perform remote procedure calls for functions or services provided by server applications. In this context, an application providing services or functions is known as a "server" and applications using those services or functions are known as "clients." There can be many clients, but typically there is only one active server.

The Data Distribution Service (DDS) is a data communication methodology that is used in connection with distributed applications. The DDS specification, which is also published by OMG, standardizes the software application programming interface (API) by which a distributed application can asynchronously exchange information based on a publish-subscribe model. In this context, applications producing data are known as "publishers" and applications consuming data are known as "subscribers." DDS can be utilized as the communication interface for a software application. The DDS specification is available from the OMG website.

A process known as CORBA object discovery (hereinafter "discovery") is performed to enable CORBA client-server communications in a computer network. Discovery is a cooperative process that is performed by the CORBA server and respective client. Each entity must perform specific tasks to complete the discovery process before CORBA client-server communications can take place. FIG. 1 is a diagram that illustrates CORBA discovery between a server 102 and a client 104 in a network. In accordance with the CORBA specification, server 102 creates a servant object 106 that includes a service interface. The service interface is defined using the OMG Interface Description Language (IDL), and the service interface is stored in an IDL file. The IDL file is processed by a CORBA IDL compiler, which generates code to be implemented by server 102 (e.g., a skeleton class for the server interface), and code to be implemented by client 104 (e.g., a proxy class containing stubs to the service interface). Next, server 102 advertises the servant 106 to clients on the network using one or more conventional techniques (discussed below). To support CORBA communication, client 104 needs to obtain a reference to servant 106, which client 104 uses to create a servant proxy 108 (hereinafter "proxy"). The servant proxy 108 is a surrogate incarnation of the service interface. After the proxy 108 is created a client-server connection 110 exists and communication is enabled for that particular client 104. Thereafter, client 104 can invoke the remote operations declared in the service interface via proxy 108 as local calls.

CORBA discovery is usually performed at startup (especially in embedded-system environments). Several known methods can be used to perform discovery, however, each of these methods has its own set of deficiencies. These methods can be complicated, they require other CORBA-defined services, they consume system resources (e.g., system memory), and/or are expensive to implement, test, and maintain.

One existing CORBA discovery methodology requires the server to write the Interoperable Object Reference (IOR) for the servant to a file or other non-volatile memory. In this regard, an IOR is a text string containing endpoint information, i.e., "how-to" instructions for making a connection to the servant object. An IOR is created by "stringifying" the servant object reference, i.e., invoking the CORBA-defined operation named object_to_string. An IOR is converted back into a servant object reference via the CORBA-defined operation named string_to_object. Thereafter, a client reads the IOR file and converts the IOR into a servant object reference, which is used to create the proxy for the client. Since file input/output is relatively slow, this method rarely satisfies the startup requirements for a real-time system.

Another common CORBA discovery technique employs the Naming Service as specified by OMG (the OMG Naming Service has two versions: the original Naming Service and the Interoperable Naming Service). The Naming Service plays the role of a bootstrap service that facilitates the initial connections between clients and servers. The Naming Service binds a given name to a specific object reference. For purposes of discovery, a server registers its servant object reference with the Naming Service under a pre-defined name. The client then queries the Naming Service with that name and receives the servant object reference in return. The client then creates the proxy using the servant object reference. This methodology demands that the Naming Service be available, the server be alive, and the servant registered before discovery can be successful. In practice, however, it is difficult (especially in distributed architectures with inter-dependencies) to assure that the server will be alive and its servant registered prior to a client query for the designated name. In such cases, client applications might need to actively poll the Naming Service, until such time as the servant is registered.

A real-time alternative to polling is to asynchronously notify clients that the servant is available, i.e., employ the Event Service, which is defined in a separate OMG specification. In place of the Event Service, the OMG Notification Service, which is often described as an extension of the Event Service, may be used. CORBA applications must perform discovery on the Event/Notification Service to gain access to event channels. The Event Service enables the server to push a notification (e.g., servant object reference, servant IOR, etc.) through an event channel. A client that is passively listening on the event channel receives the notification, which is used to create the proxy. Using the Event Service in this manner is actually an extension of the second method described above, since the client needs to query the Naming Service first. In this regard it is important that the client first gain access to the event channel before querying the Naming Service to avoid the possibility missing the notification from the server. Should the client receive the object reference via the Naming Service, a coincidental event-channel notification can be ignored. In addition, most event channels do not guarantee durability of a notification and, therefore, clients need to query the Naming Service. Once the client has the servant object reference, the connections to the Naming Service and Event Service can be terminated. However, the Naming Service and/or Event Service must remain active.

For the reasons discussed above, conventional CORBA discovery techniques have shortcomings that can make them difficult or cumbersome to develop, implement, and test. Accordingly, it is desirable to have an improved CORBA discovery methodology that leverages non-CORBA data communication techniques. Furthermore, other desirable features and characteristics of the present invention will become apparent from the subsequent detailed description and the appended claims, taken in conjunction with the accompanying drawings and the foregoing technical field and background.

BRIEF SUMMARY

A methodology according to the invention improves the discovery process for software applications employing CORBA-based communications. The methodology can be deployed in systems that support both CORBA and DDS applications. In practice, certain OMG-defined CORBA objects can be eliminated without impeding performance of CORBA discovery procedures.

The above and other aspects of the invention may be carried out in one form by a method for initiating client-server communication in a computing environment supporting both CORBA and DDS applications. The method includes: creating a CORBA servant object for a server in the computing environment, converting the CORBA servant object into a DDS-compatible servant IOR, publishing the servant IOR with a DDS infrastructure in the computing environment, receiving the servant IOR at a client in the computing environment, and producing a servant proxy object for the client. The servant proxy object is configured to communicate with the CORBA servant object.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
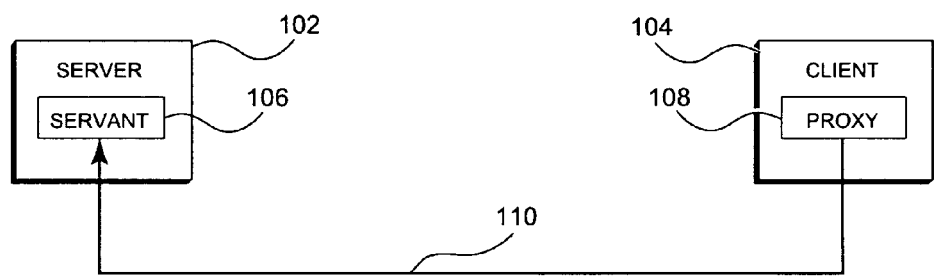
FIG. 1 is a diagram that illustrates CORBA discovery between a server and a client in a network.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, processing elements, logic elements, look-up tables, or the like, which may carry out a variety of functions under the control of one or more microprocessors or other control devices. In addition, those skilled in the art will appreciate that the present invention may be practiced in conjunction with any number of computing environments and network topologies, and that the simplified system described herein is merely one exemplary application for the invention.

For the sake of brevity, conventional techniques related to CORBA applications, DDS applications, distributed processing, remote procedure calls, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following definitions apply to various terms used herein:

Server—a logical entity that represents an application providing services or functions in a computing environment.

Client—a logical entity that represents an application that uses services or functions provided by a server.

Common Object Request Broker Architecture (or CORBA)—an infrastructure that computer applications employ to synchronously communicate with each other over computer networks. The CORBA specification (current version is CORBA 3.0; available for free download at the website www.omg.org) is incorporated by reference herein.

Data Distribution Service (or DDS)—a data communication methodology that is used in connection with distributed applications. DDS relates to a publish-subscribe model for real-time data distribution. The DDS specification (available for download at the website www.omg.org) is incorporated by reference herein.

CORBA servant object (or servant)—an instantiation of an interface class defining the operations and attributes supported by the service application.

Interoperable Object Reference (or IOR)—a sequence of object-specific protocol profiles plus a type ID, which can be used to extract the location of a CORBA object for discovery.

Topic—a DDS defined entity that uniquely identifies some data items in the global data space.

Servant Proxy (or Proxy)—a surrogate incarnation of the servant or service interface maintained by a server.

Object Request Broker (ORB)—an implementation of the CORBA specification(s). An ORB can be procured from a vendor, or downloaded for free.

Domain Participant—a DDS defined entity that represents the local membership of an application within a communication plane referred to as the domain.

Support Type—a generic term describing a set of specific operations and attributes needed to support and manage a data type. A Support Type is usually auto-generated by a tool that parses an OMG IDL file containing data-type declarations.

QOS—Quality of Service.

Figure 2:
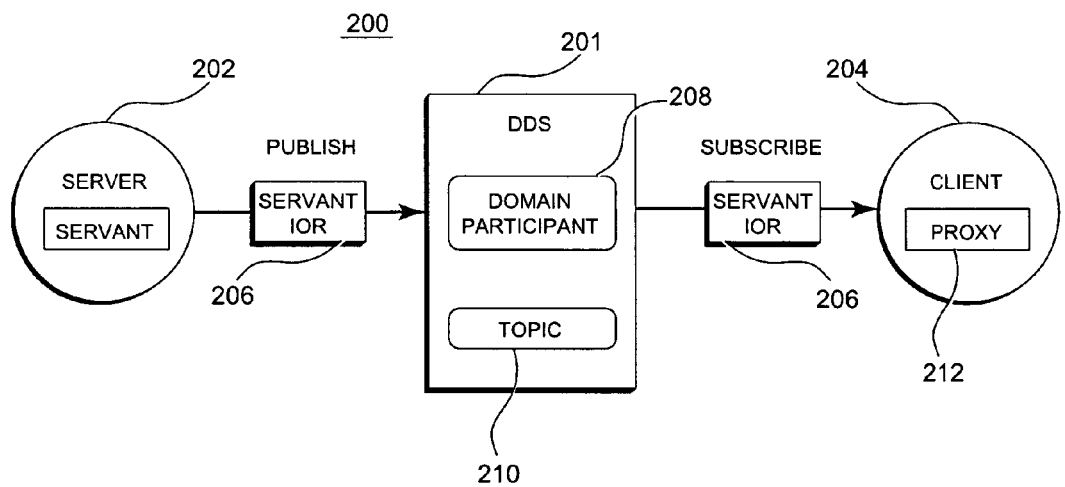
FIG. 2 is a diagram that illustrates CORBA discovery utilizing a DDS infrastructure.

The example embodiment of the invention described herein performs discovery for CORBA client-server applications in environments that also support DDS. FIG. 2 is a diagram that illustrates CORBA discovery utilizing a DDS infrastructure 201. FIG. 2 depicts a simplified computing environment 200 that includes a server 202 and at least one client 204. In practice, server 202 may be a server application resident on one piece of hardware, while client 204 may be a client application resident on another piece of hardware. Although not depicted in FIG. 2, server 202 and client 204 are suitably configured to communicate with each other over any suitable network architecture, e.g., an Ethernet architecture.

The discovery technique incorporates DDS publish-subscribe functionality for the server to distribute a servant IOR 206 to clients. CORBA discovery is achieved by distributing the servant IOR 206 using only DDS-compliant middleware (e.g., NDDS 4.0) for server 202 and client 204. Notably, the current version of DDS does not support the distribution of CORBA objects. Consequently, the technique described herein utilizes the servant IOR 206, which is a text string that is compatible with the distribution types specified by DDS. In other words, the servant IOR 206 is distributed within the context of a DDS data object.

In the example embodiment, server 202 publishes the servant IOR 206 to an implicit Domain Participant 208 and Topic 210. A subscribing client 204 receives the servant IOR 206 and converts it into a servant object, which is then used to create a servant proxy 212 for client 204. The servant proxy 212 is utilized for communication with server 202. In one practical embodiment, the QOS parameters define "Reliable" data distribution while restricting data distribution to the "Local-Transient" state of the publisher. In other words, data is only distributed while the publishing server 202 is alive, i.e., while the publishing server 202 is present and not yet terminated. The terms Reliable and Local-Transient are QOS parameters that are defined in the DDS specification.

Figure 3:
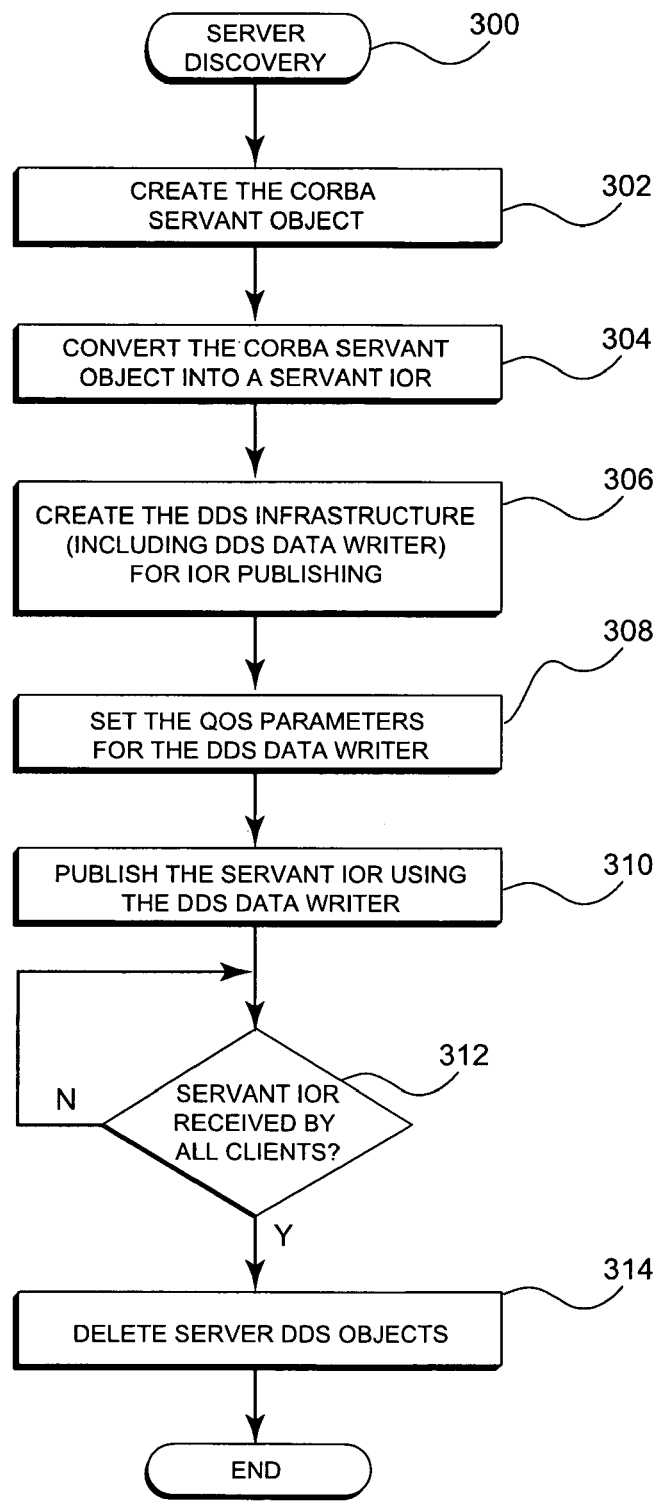
FIG. 3 is a flow chart of server tasks performed in connection with a discovery process according to an example embodiment of the invention.
Figure 4:
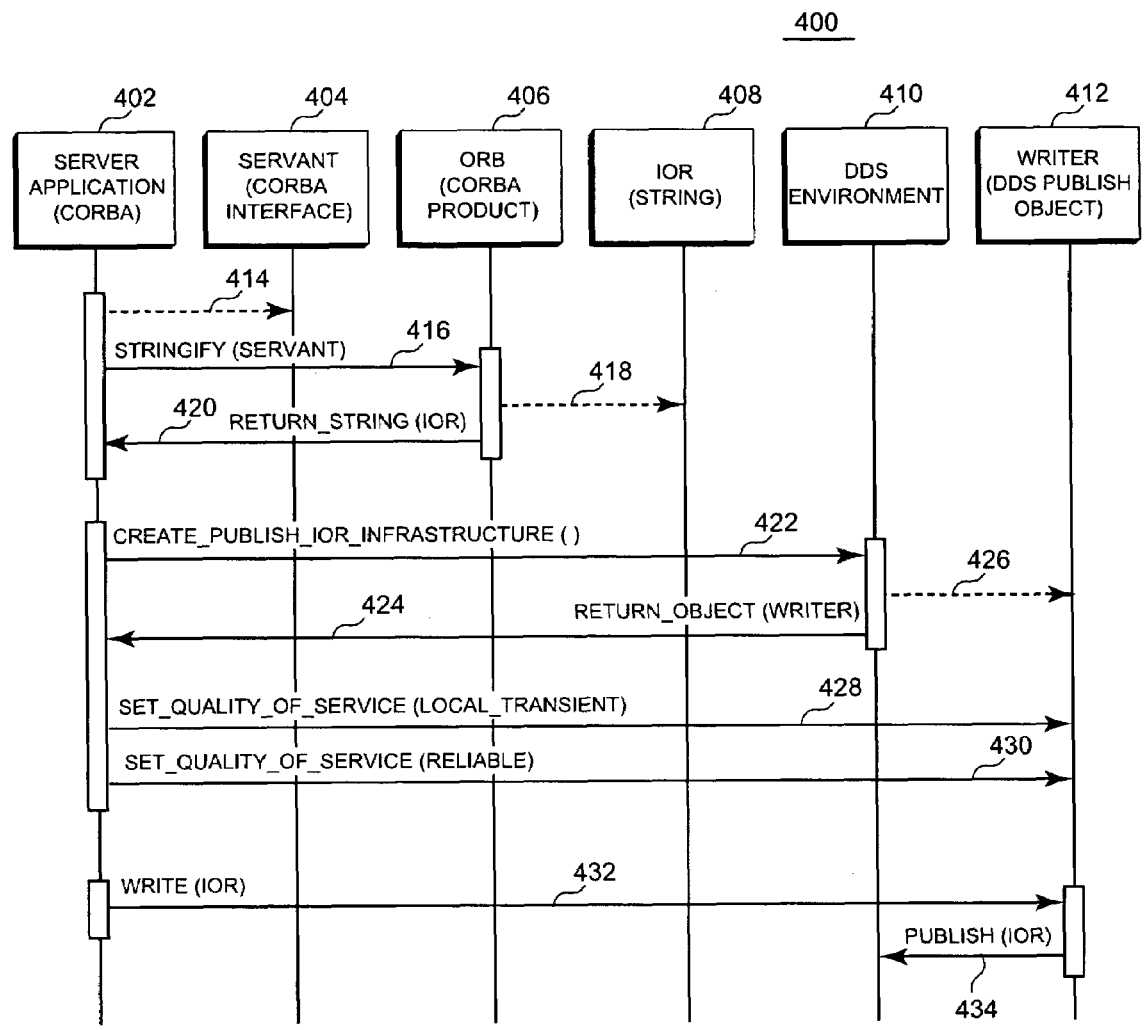
FIG. 4 is a sequence diagram of server tasks performed in connection with a discovery process according to an example embodiment of the invention.

FIG. 3 is a flow chart of server tasks, and FIG. 4 is a sequence diagram 400 of server tasks, which may be performed in connection with a discovery process according to an example embodiment of the invention. For convenience, the following description refers to the server tasks depicted in FIG. 3 as "server discovery process" 300. The various tasks performed in connection with process 300 may be performed by software, hardware, firmware, or any combination thereof. In practical embodiments, portions of process 300 may be performed by different elements or logical components of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein.

FIG. 4 depicts a number of logical elements that play a role in the CORBA discovery procedure. In particular, FIG. 4 depicts: a server application 402; a CORBA servant object 404; an ORB 406; a servant IOR 408; a DDS environment 410; and a DDS data writer object 412. An ORB is an implementation of the CORBA Specification, i.e., it is a product that can be purchased or obtained from a vendor. Typically, an ORB is implemented as a framework of libraries and support utilities that applications access to perform client-server interactions as defined in the specification. FIG. 4 (along with FIG. 6 and FIG. 7) is a Unified Modeling Language (UML) sequence diagram that depicts the sequence of events ordered from top to bottom. A solid line with an arrow represents a "message," wherein the direction of the message is indicated by the arrowhead. In this context, messages are notional, but in simple terms, a message is analogous to a function call of a programming language. A dashed line with an arrow refers to the "creation" of the object to which it is pointing. The narrow vertically aligned rectangles in these figures, which are positioned upon an object's lifeline, represent a procedure or an uninterrupted sequence of activity within that lifeline.

Server discovery process 300 is performed as needed to accomplish CORBA discovery in a computing environment that supports both CORBA and DDS. Process 300 incorporates DDS publish-subscribe functionality for the server to distribute a servant IOR to clients in the computing environment. Process 300 can be performed at any time, assuming that the CORBA environment has been properly initialized. Process 300 may begin by creating a CORBA servant object for a server in the computing environment (task 302). As set forth in the CORBA specification, the CORBA servant object includes or defines a service interface for the server. Task 302 is represented by the dashed arrow 414 in sequence diagram 400. In this example, the server application 402 creates and maintains the CORBA servant object 404. Next, process 300 converts the CORBA servant object into a DDS-compatible servant IOR (task 304). In a practical embodiment, this conversion may involve stringifying the CORBA servant object into a suitable text string of connection instructions (the resulting servant IOR includes instructions for establishing a CORBA connection to the server). Notably, the servant IOR text string is compliant with the distribution types specified by DDS. As an example, task 304 may invoke the CORBA operation known as object_to_string. Task 304 is represented by the arrow 416 and the dashed arrow 418 in sequence diagram 400. In this example, the server application 402 creates the servant IOR 408. Arrow 416 represents server application 402 sending the newly created servant to ORB 406 to be "stringified." The arrow 420 represents the result of the stringify process, i.e., the return of the IOR to server application 402.

In addition to tasks 302 and 304, server discovery process creates a DDS infrastructure to accommodate publishing of the servant IOR (task 306). Task 306 need not be executed after tasks 302 and 304; process 300 may create the DDS infrastructure before generating the servant IOR. The DDS infrastructure enables the DDS environment 410 to assist in CORBA discovery of the predefined service interface associated with the server. Task 306 is represented by the arrow 422 in sequence diagram 400. In this example embodiment, server application 402 interacts with DDS environment 410 to perform task 306. The DDS infrastructure created during task 306 includes one or more server DDS objects, such as a DDS Data Writer object (described in more detail below), which is utilized to publish the servant IOR in a DDS-compliant manner. The arrow 424 in sequence diagram 400 represents the return of the DDS Data Writer object to server application 402, and the dashed arrow 426 in sequence diagram 400 indicates creation of the writer object 412. The dashed arrow 426 represents the creation of the writer object 412 by the DDS environment 410, which is returned to server application 402.

In the practical embodiment described herein, server discovery process 300 sets one or more QOS parameters for the DDS Data Writer object (task 308) to obtain the desired functionality. For example, the QOS parameters may be set to facilitate late subscription by clients, after publishing of the servant IOR. In other words, the QOS parameters may be selected such that clients are still able to receive the servant IOR via the DDS environment even after an abnormally long delay. In accordance with one example embodiment, the following settings are made during task 308: Durability=LOCAL_TRANSIENT, and Reliability=RELIABLE. The Durability setting is represented by the arrow 428 in sequence diagram 400, and the Reliability setting is represented by the arrow 430 in sequence diagram 400. Arrows 428 and 430 terminate at the writer object 412 because the writer object 412 is responsible for setting the specified QOS. With these settings (which are defined in the DDS specification), the system can support scenarios in which the sequence of publishing and subscribing cannot be determined and/or the timeline of the server and clients cannot be determined. These QOS settings permit an unrestricted publish-subscribe sequence for the server and clients, respectively. This ensures that clients that are "late subscribers" will receive the data object containing the servant IOR even after it has been published by the server. If, however, the server is no longer alive, then late subscribing clients will not be able to receive the servant IOR.

Once task 308 has been completed, the server can publish the servant IOR within the context of a DDS data object using DDS techniques. In this regard, the data object is defined using the OMG Interface Description Language (IDL), and is stored in an IDL file. The IDL file is processed by a DDS IDL complier, which generates code to be implemented by DDS users (e.g., the server and the clients). Since an IOR is a text string, the definition of the distribution object includes a text string of adequate length, such as 512 bytes.

Server discovery process 300 may perform a task 310 to publish the servant IOR with the DDS infrastructure. In particular, process 300 publishes the servant IOR using the DDS Data Writer object, which writes a data object containing the servant IOR. Task 310 is represented by the arrows 432 and 434 in sequence diagram 400. Arrow 432 represents a write instruction or command from server application 402 to DDS Data Writer object 412, and arrow 434 represents the servant IOR being published by DDS Data Writer object 412 for distribution by DDS environment 410. In practice, the server need not publish the servant IOR more than one time. Server discovery process 300 may, however, test whether the servant IOR has been received by all of the target clients (query task 312). If so, then process 300 may prompt the server to delete or destroy the server DDS objects (task 314). Alternatively, the server may delete the server DDS objects at any designated time after publishing of the servant IOR. The deletion of the server DDS objects may be desirable to preserve memory.

Figure 5:
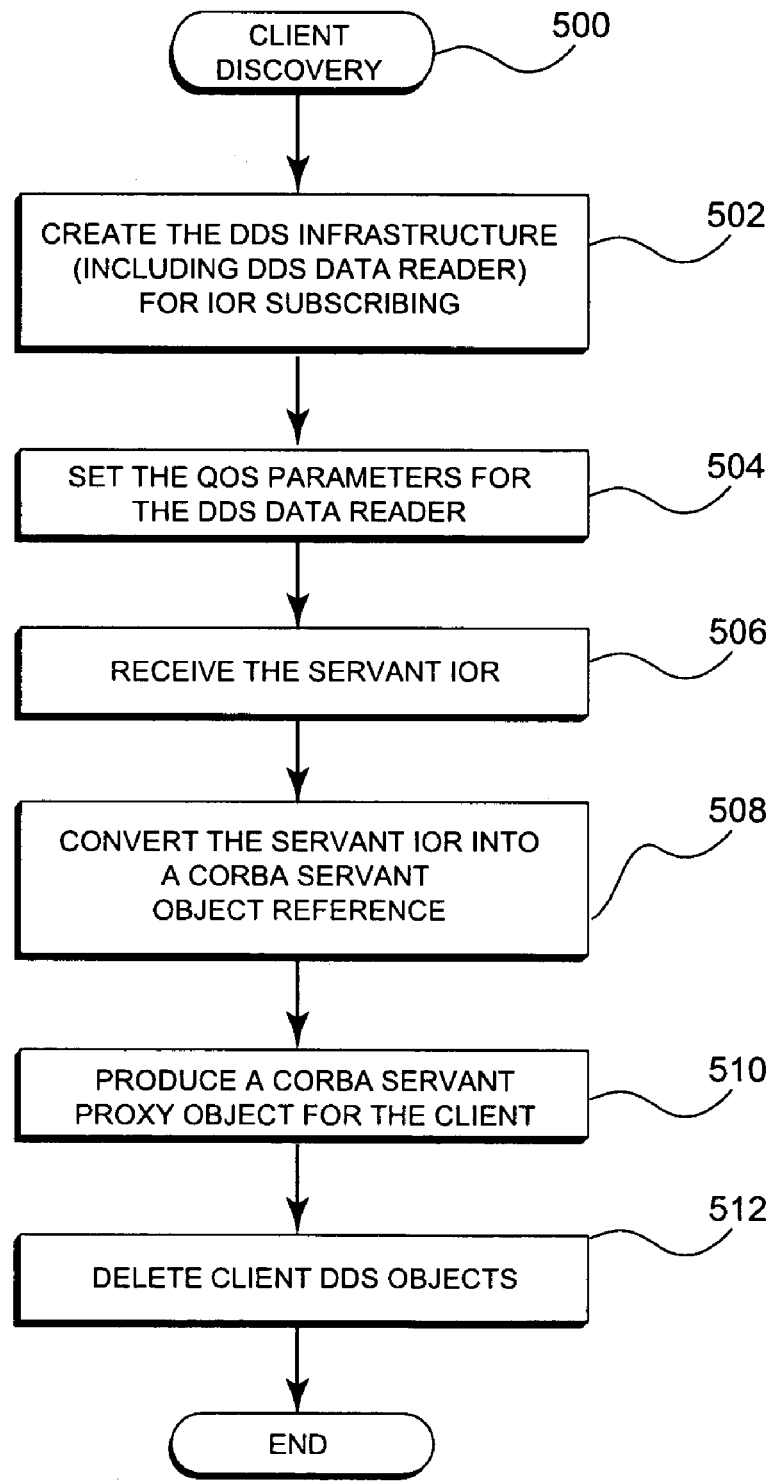
FIG. 5 is a flow chart of client tasks performed in connection with a discovery process according to an example embodiment of the invention.
Figure 6:
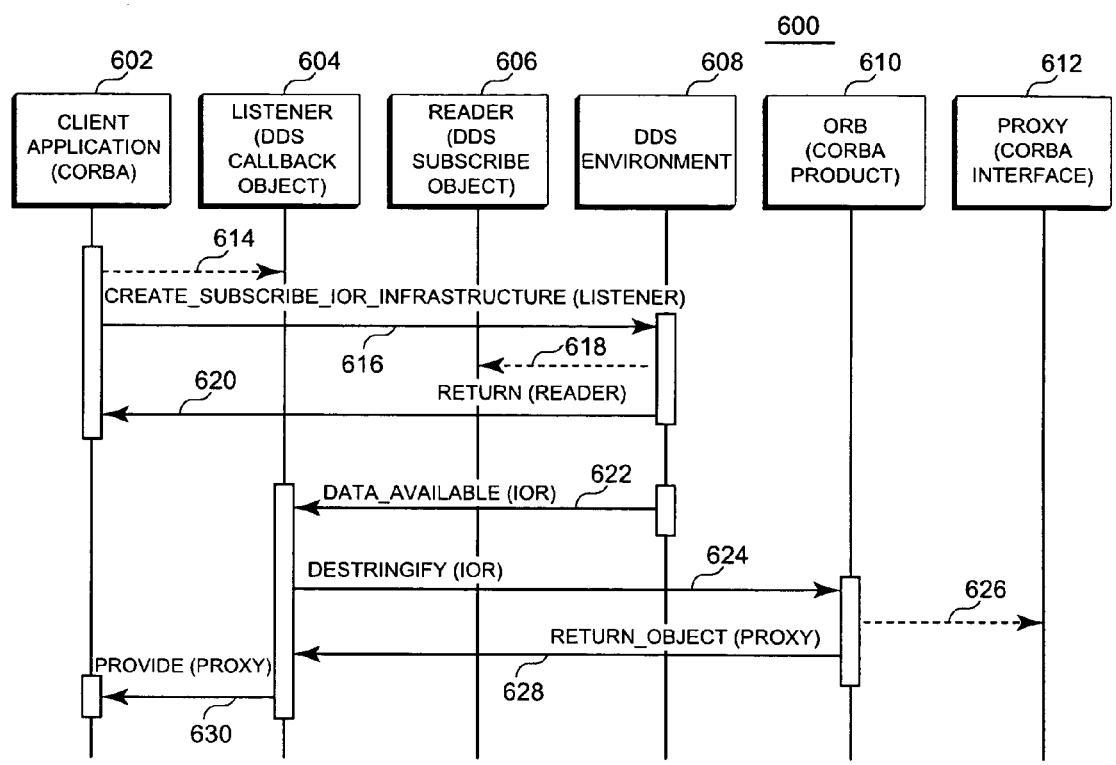
FIG. 6 is a sequence diagram of client tasks performed in connection with a discovery process according to an example embodiment of the invention.
Figure 7:
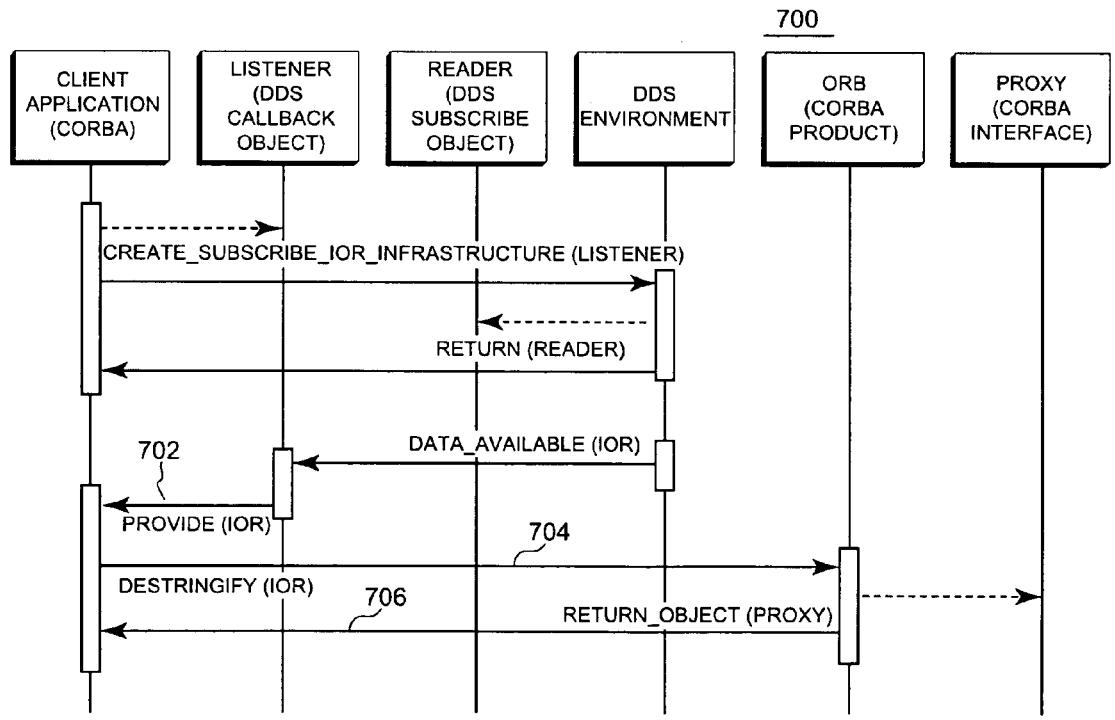
FIG. 7 is a sequence diagram of client tasks performed in connection with a discovery process according to an alternate embodiment of the invention.

FIG. 5 is a flow chart of client tasks, and FIG. 6 is a sequence diagram 600 of client tasks, which may be performed in connection with a discovery process according to an example embodiment of the invention. For convenience, the following description refers to the client tasks depicted in FIG. 5 as "client discovery process" 500. Process 500 may be performed in conjunction with server discovery process 300 (see FIG. 3) to complete a CORBA discovery procedure in a computing environment. The various tasks performed in connection with process 500 may be performed by software, hardware, firmware, or any combination thereof. In practical embodiments, portions of process 500 may be performed by different elements or logical components of the described system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

FIG. 6 depicts a number of logical elements that play a role in the CORBA discovery procedure. In particular, FIG. 6 depicts: a client application 602; a DDS listener object 604; a DDS data reader object 606; a DDS environment 608; an ORB 610; and a servant proxy object 612.

Client discovery process 500 is performed as needed to accomplish CORBA discovery in a computing environment that supports both CORBA and DDS. Process 500 incorporates DDS publish-subscribe functionality for the client to subscribe to a service/function provided by a server in the computing environment. Process 500 can be performed at any time, assuming that the CORBA environment has been properly initialized and that the server has published a servant IOR as described above. Process 500 may begin by creating a DDS infrastructure to accommodate receiving of (and subscribing to) a servant IOR published by a server in the computing environment (task 502). The DDS infrastructure enables the DDS environment 608 to assist in CORBA discovery of the predefined service interface associated with the server. Task 502 is represented by the arrow 616 in sequence diagram 600. In this example embodiment, client application 602 interacts with DDS environment 608 to perform task 502. The DDS infrastructure created during task 502 includes one or more client DDS objects, such as a DDS Listener and a DDS Data Reader object (described in more detail below), which are utilized to receive the servant IOR in a DDS-compliant manner. The dashed arrow 614 in sequence diagram 600 represents the creation of the listener object 604. The dashed arrow 618 indicates creation of the DDS data reader object 606 by DDS environment 608, and the arrow 620 represents the return of the DDS data reader object 606 to client application 602.

In the practical embodiment described herein, client discovery process 500 sets one or more QOS parameters for the DDS Data Reader object (task 504) to obtain the desired functionality. For example, the QOS parameters may be set to facilitate late subscription by clients, following publication of the servant IOR by the server, as described above in connection with server discovery process 300. In accordance with one example embodiment, the following settings are made during task 504: Durability=LOCAL_TRANSIENT, and Reliability=RELIABLE.

Once task 504 has been completed, the client can receive the servant IOR as a DDS data object using DDS techniques (task 506). In practice, the client is configured to asynchronously receive the data object containing the servant IOR. The arrow 622 represents the delivery of the IOR by the DDS environment 608 to the listener object 604 (which was passed to the DDS environment 608, as indicated by the arrow 616). Once the client receives this data object, it can extract the servant IOR and convert the servant IOR into a CORBA servant object reference (task 508). In a practical embodiment, this conversion may involve destringifying the servant IOR into a suitable CORBA object. As an example, task 508 may invoke the CORBA operation known as string_to_object. In addition, the CORBA object may be narrowed to the interface using any suitable technique. In this context, the term "narrow" is a down-casting of an object, i.e., obtaining a reference from a base interface to a more derived interface.

Task 508 is represented by the arrow 624 and the dashed arrow 626 in sequence diagram 600. In this example, the conversion produces a CORBA servant proxy object for the client (task 510), where the proxy object is configured to communicate with a CORBA servant object maintained by the server. The dashed arrow 626 indicates the creation of the proxy object. Eventually, the ORB 610 returns the proxy object to DDS Listener 604 (represented by the arrow 628 in sequence diagram 600), and DDS Listener 604 provides the proxy object to client application 602 (represented by the arrow 630 in sequence diagram 600).

The CORBA discovery procedure is effectively complete once task 510 has created the CORBA servant proxy object at the client. Thereafter, the client (and any other subscribing clients) is able to locate the desired service/function provided by the server using traditional CORBA techniques. In other words, CORBA-compliant client-server communications can proceed at this time. Once the client creates the servant proxy, discovery (from the client perspective) is complete and client discovery process 500 may prompt the client to delete or destroy the client DDS objects (task 512). The deletion of the client DDS objects may be desirable to preserve memory.

Sequence diagram 600 depicts one example embodiment wherein the above conversions are performed by DDS Listener 604, which then passes the servant proxy to client application 602. In an alternate embodiment (see sequence diagram 700 of FIG. 7), the conversions are performed by the client application rather than the DDS Listener. In this embodiment, the DDS Listener provides the servant IOR to the client application upon receipt (as indicated by the arrow 702 in sequence diagram 700). Consequently, the client application communicates with the ORB to generate the CORBA servant proxy object, and the ORB returns the proxy object directly to the client application. The arrow 704 in sequence diagram 700 represents the conversion of the servant IOR into the proxy object, and the arrow 706 in sequence diagram 700 represents the return of the proxy object to the client application.

Figure 8:
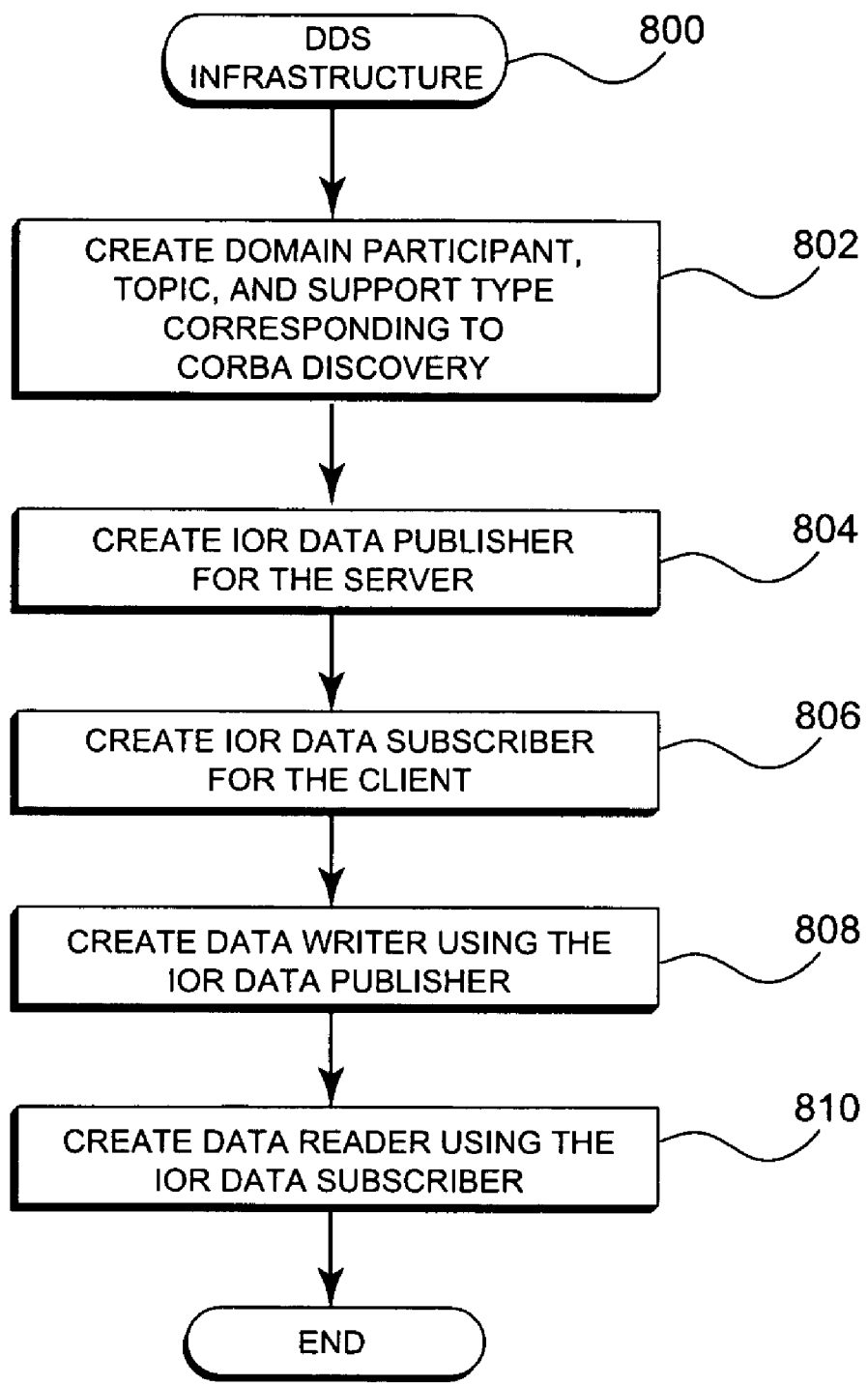
FIG. 8 is a flow chart of a DDS infrastructure creation process according to an example embodiment of the invention.

As mentioned above, the example CORBA discovery process involves the creation of a DDS infrastructure that enables the CORBA-compliant server and clients to handle DDS-compliant objects. In this regard, FIG. 8 is a flow chart of a DDS infrastructure creation process 800 according to an example embodiment of the invention. FIGS. 9-12 are diagrams that illustrate a typical CORBA discovery process and the creation of an example DDS infrastructure. Process 800 will be described in detail with reference to FIGS. 9-12. Process 800 may be performed in conjunction with server discovery process 300 (see FIG. 3) and/or in conjunction with client discovery process 500 (see FIG. 5) to complete a CORBA discovery procedure in a computing environment. The various tasks performed in connection with process 800 may be performed by software, hardware, firmware, or any combination thereof. In practical embodiments, portions of process 800 may be performed by different elements or logical components of the described system. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

Figure 9:
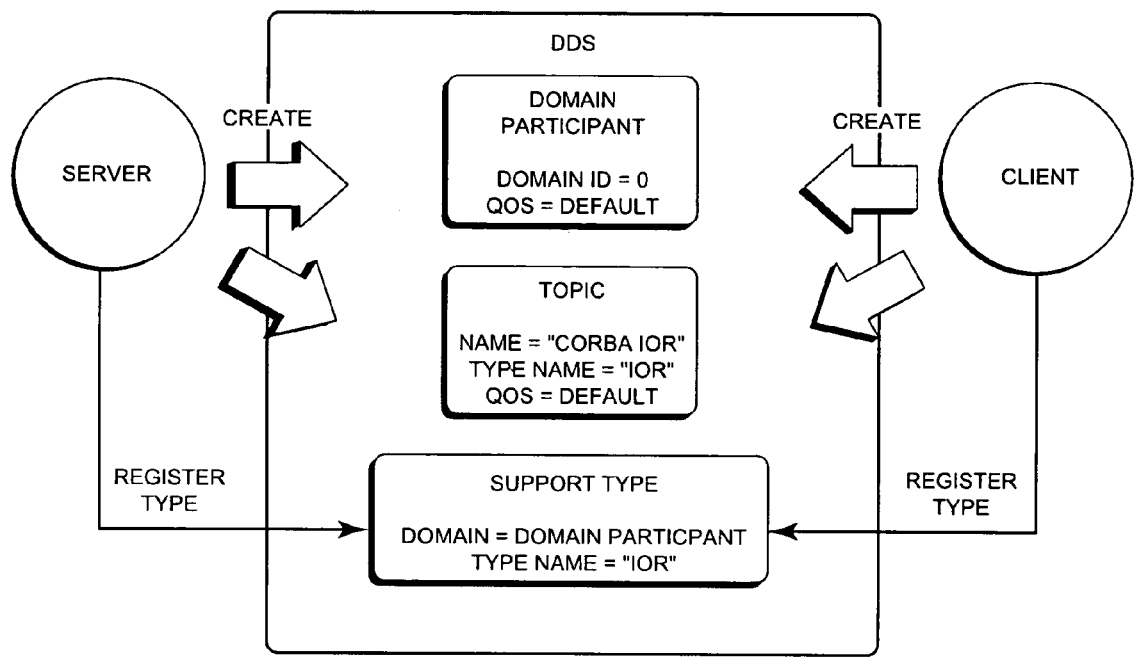
FIGS. 9-12 are diagrams that illustrate a CORBA discovery process according to an example embodiment of the invention.

DDS infrastructure creation process 800 may begin with a task 802, during which the server and clients each create a Domain Participant, a Topic, and a Support Type corresponding to the particular CORBA discovery procedure. In a practical embodiment, the server and clients execute task 802 by interacting with the DDS environment of the computer architecture. The server and clients use the same operations and the same arguments to create these objects; the values of the arguments are valid and do not interfere with the subsequent tasks described below. The DDS-defined factory operation to create a Domain Participant requires three arguments: the Domain ID; a Participant QOS; and a Participant Listener. The DDS-defined support type operation to register the data type requires two arguments: the Domain Participant and the type name. The DDS-defined participant-factory operation to create a Topic requires four arguments: a name; type name; Topic QOS; and a Topic Listener. For this application, the default values for the designated QOS arguments and a zero value for the designated Listener arguments are sufficient. FIG. 9 is a diagram that illustrates the creation of the objects associated with task 802. Briefly, the creation of these objects are required by the DDS Specification to establish a publish-subscribe environment. The Domain Participant is required to determine the (virtual) communication channel through which data will be exchanged. The Domain Participant provides the factory method to create a Topic.

Figure 10:
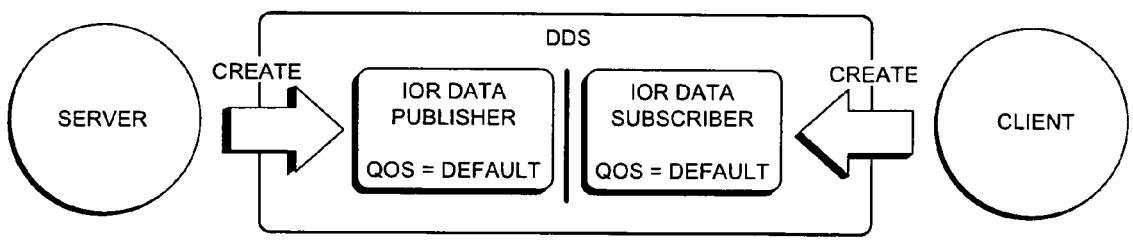

DDS infrastructure creation process 800 also causes the server to create an IOR Data Publisher (task 804), and causes each of the clients to create an IOR Data Subscriber (task 806). The arguments required by the operations to create these objects need only to be valid. The DDS-defined participant-factory operation to create a Publisher requires two arguments: a Publisher QOS; and a Publisher Listener. For this application the default values for the QOS and a zero value for the Publisher Listener are sufficient. The DDS-defined participant-factory operation to create a Subscriber requires two arguments: a Subscriber QOS and a Subscriber Listener. For this application the default values for the QOS and a zero value for the Subscriber Listener are sufficient. FIG. 10 is a diagram that illustrates the creation of the IOR Data Publisher and the IOR Data Subscriber associated with tasks 804 and 806. Briefly, a Publisher object is required to create a Data Writer object, and a Subscriber object is required to create a Data Reader object (note that the Publisher and Subscriber objects were not shown in the sequence diagrams of FIGS. 4, 6, and 7).

Figure 11:
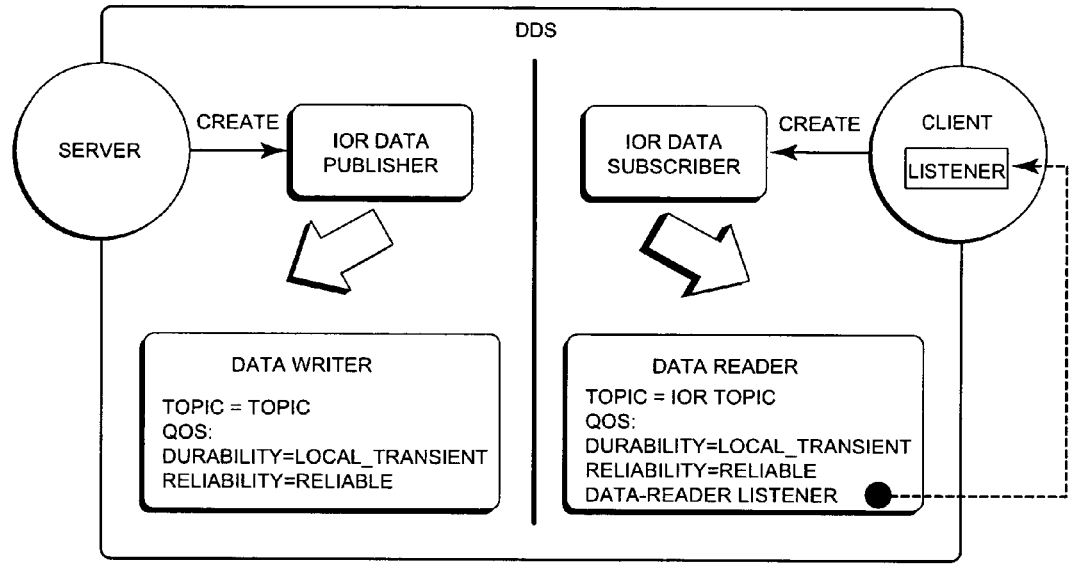

The server uses the Data Publisher to create a Data Writer (task 808), while the clients use their respective Data Subscriber to create a Data Reader (task 810). The server passes three arguments to create a Data Writer: the Topic (created during task 802); the Data Writer QOS; and the Data Writer Listener, which can be zero. This value can be zero because the Data Writer need not require a Listener, i.e., any data to accomplish CORBA discovery. A client passes three arguments to create a Data Reader: the Topic (created during task 802); the Data Reader QOS; and a Data Reader Listener. These QOS settings are discussed above in connection with server discovery process 300 and client discovery process 500. FIG. 11 is a diagram that illustrates the creation of the Data Writer and Data Reader associated with tasks 808 and 810. Briefly, the creation of the Data Reader is required to activate and maintain the subscription for the client application. In FIG. 11, the dashed arrow represents the creation of a Listener object by the client application.

Figure 12:
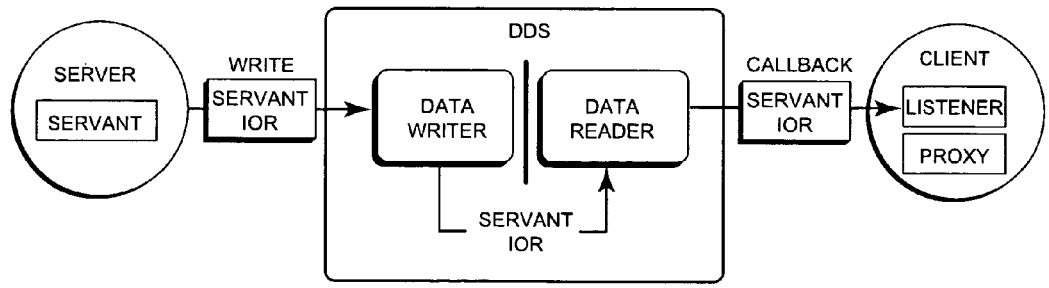

In the practical embodiment, a client provides a handle (i.e., a reference) to a Data Reader Listener to asynchronously receive the data object containing the servant IOR. A Data Reader Listener contains several callback routines, one of which provides notification to the Reader Listener that "data is available" for retrieval. In this regard, the client provides a suitable callback routine and assigns it to the Data Reader Listener. As described above, the server publishes the servant IOR using the Data Writer to write a data object containing the servant IOR. Upon creation of the Data Reader, a client is able to receive the data object via the callback routine supplied in the Data Reader Listener. Thereafter, the client creates the proxy based upon the received servant IOR. FIG. 12 is a diagram that illustrates this portion of the CORBA discovery procedure.

As an alternative to supplying the callback routine in the Data Reader Listener, the callback routine may be supplied to a Data Subscriber Listener or Domain-Participant Listener (these are supersets of a Data Reader Listener). In this case, a handle to an appropriate Listener would be passed to the routine creating the Domain Participant or Data Subscriber, respectively. A client may also read data from the Data Reader, thereby eliminating the need to provide a handle to a Data Reader Listener.

Typically, the discovery process only needs to be performed once to enable the clients to determine the location of the desired function/service. Thereafter, the clients will know the location for subsequent calls. Alternatively, but unlikely in a practical implementation, the discovery process can be executed each time a client calls for the function or service.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for initiating client-server communication in a computing environment supporting both Common Object Request Broker Architecture (CORBA) and Data Distribution Service (DDS) applications, said method comprising:
    creating a CORBA servant object for a server in the computing environment;
    converting said CORBA servant object into a DDS-compatible servant Interoperable Object Reference (IOR);
    creating a DDS infrastructure including server DDS objects to accommodate publishing of said DDS-compatible servant IOR
    publishing said DDS-compatible servant IOR with said DDS infrastructure in the computing environment;
    receiving said DDS-compatible servant IOR at a client in the computing environment;
    producing a servant proxy object for said client, said servant proxy object being configured to communicate with said CORBA servant object; and
    deleting said server DDS objects after publishing of said DDS-compatible servant IOR.

2. A method according to claim 1, wherein converting said CORBA servant object comprises stringifying said CORBA servant object into a text string of connection instructions.

3. A method according to claim 2, wherein stringifying said CORBA servant object invokes a CORBA object_to_string operation.

4. A method according to claim 1, wherein creating said DDS infrastructure comprises generating a DDS data writer object.

5. A method according to claim 1, wherein said CORBA servant object comprises a service interface for said server.

6. A method according to claim 1, wherein creating said DDS infrastructure comprises creating said DDS infrastructure to further accommodate receiving of said servant IOR.

7. A method according to claim 6, wherein creating said DDS infrastructure further comprises generating a DDS data reader object.

8. A method according to claim 1, wherein producing said servant proxy object comprises destringifying said servant IOR.

9. A method according to claim 8, wherein destringifying said servant IOR invokes a CORBA string to object operation.

10. A method for initiating client-server communication in a computing environment supporting both Common Object Request Broker Architecture (CORBA) and Data Distribution Service (DDS) applications, said method comprising:
    creating a CORBA servant object for a server in the computing environment;
    converting said CORBA servant object into a DDS-compatible servant Interoperable Object Reference (IOR);
    creating a DDS infrastructure including server DDS objects to accommodate publishing of said DDS-compatible servant IOR;
    publishing said DDS-compatible servant IOR with said DDS infrastructure; and
    deleting said server DDS objects after publishing of said servant IOR.

11. A method according to claim 10, wherein converting said CORBA servant object comprises stringifying said CORBA servant object into a text string of connection instructions.

12. A method according to claim 11, wherein stringifying said CORBA servant object invokes a CORBA object_to_string operation.

13. A method according to claim 10, wherein creating said DDS infrastructure comprises generating a DDS data writer object.

14. A method according to claim 13, further comprising setting quality of service (QOS) parameters for said DDS data writer object to facilitate late subscription by clients after publishing of said servant IOR.

15. A method for initiating client-server communication in a computing environment supporting both Common Object Request Broker Architecture (CORBA) and Data Distribution Service (DDS) applications, said method comprising:
    creating a DDS infrastructure including client DDS objects to accommodate subscribing to a DDS-compatible servant interoperable object reference (IOR) published by a server in said computing environment;
    receiving said DDS-compatible servant IOR at a client in the computing environment;
    converting said DDS-compatible servant IOR into a CORBA servant object reference;
    producing a servant proxy object for said client, said servant proxy object being configured to communicate with a CORBA servant object maintained by said server; and
    deleting said client DDS objects after producing said servant proxy object.

16. A method according to claim 15, wherein creating said DDS infrastructure comprises generating a DDS data reader object.

17. A method according to claim 16, further comprising setting quality of service (QOS) parameters for said DDS data reader object to facilitate late subscription by said client after publishing of said DDS-compatible servant IOR.

18. A method according to claim 15, wherein producing said servant proxy object comprises destringifying said DDS-compatible servant IOR.

19. A method according to claim 18, wherein destringifying said DDS-compatible servant IOR invokes a CORBA string_to_object operation.

* * * * *

UNITED STATES PATENT AND TRADEMARK OFFICE
CERTIFICATE OF CORRECTION

PATENT NO. : 7,665,096 B2  Page 1 of 1
APPLICATION NO. : 11/282208
DATED : February 16, 2010
INVENTOR(S) : James H. Weida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Twenty-eighth Day of December, 2010

David J. Kappos
*Director of the United States Patent and Trademark Office*